Dec. 17, 1957 N. MEYERS 2,816,501
ADJUSTABLE TOASTER
Filed March 17, 1955 2 Sheets-Sheet 1

Norman Meyers
INVENTOR.

Dec. 17, 1957 N. MEYERS 2,816,501
ADJUSTABLE TOASTER
Filed March 17, 1955 2 Sheets-Sheet 2

Norman Meyers
INVENTOR.

BY *Clarence A. O'Brien*
*and Harvey B. Jacobson*
Attorneys

United States Patent Office 2,816,501
Patented Dec. 17, 1957

2,816,501

ADJUSTABLE TOASTER

Norman Meyers, Norwalk, Conn., assignor of twenty-five percent each to George L. Meyers, Murray Meyers and Herbert Meyers, Norwalk, Conn.

Application March 17, 1955, Serial No. 495,027

1 Claim. (Cl. 99—390)

This invention relates to an automatic electric toaster whose primary object is the provision of means for toasting slices or portions of bread or rolls of various thicknesses.

A further object of the invention resides in the provision of an electric toaster having movable heating elements so arranged as to be capable of being moved toward or away from other fixed heating elements whereby the space between the heating elements can be varied at will to compensate for the thickness of the slice of bread or other roll being toasted in this electric toaster.

The construction of this invention features the utilization of novel mounting rods and an associated mechanism utilized in conjunction with the mounting rods for moving these mounting rods towards and away from fixed heating element assemblies. Attached to the mounting rods are movable heating element assemblies which include heating coils of conventional construction.

Conventional thermostatically controlled lifter assemblies may be utilized in conjunction with this invention so as to raise the slice of bread or roll after it has been toasted.

Still further objects and features of this invention reside in the provision of an adjustable electric toaster that is simple in construction, highly efficient in operation, pleasing in appearance and which is relatively inexpensive to manufacture, thereby permitting wide production and distribution.

These, together with the various ancillary objects and features of the invention which will become apparent as the following description proceeds, are attained by this automatic electric toaster, a preferred embodiment of which has been illustrated in the accompanying drawings, by way of example only, wherein.

Figure 1:
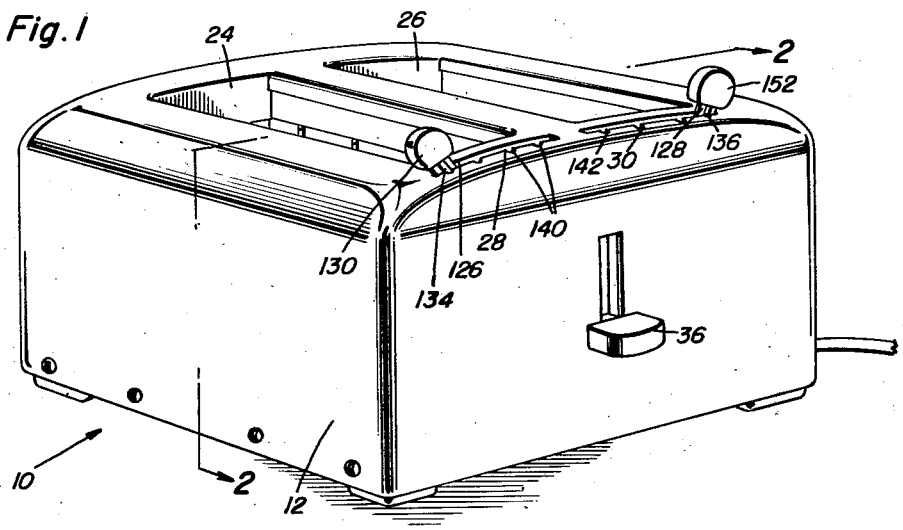
Figure 1 is a perspective view of the automatic electric toaster comprising the present invention.

With continuing reference to the accompanying drawings wherein like reference numerals designate similar parts throughout the various views, reference numeral 10 is used to generally designate the automatic electric toaster comprising the present invention. This electric toaster includes a housing 12 formed of sheet metal including a base plate 14 having flanges 16 and 18 attached thereto, as by fasteners 20 and 22. The housing has a pair of central openings 24 and 26 as well as a pair of slots 28 and 30 therein.

Mounted in the toaster 10 are conventional lift assemblies 32 and 34 in alignment with the openings 24 and 26 and which are controlled not only by the handle 36 but by a conventional thermostatic locking device 38 and a spring lifting member 40. The operation of the thermostatic locking member 38 is, as is conventional, such that the spring 40 is permitted to raise the lifter assemblies 32 and 34 when enough heat has been applied to the thermostatic locking element 36 to actuate this element, whereby it will release the lifter assemblies.

Figure 4:
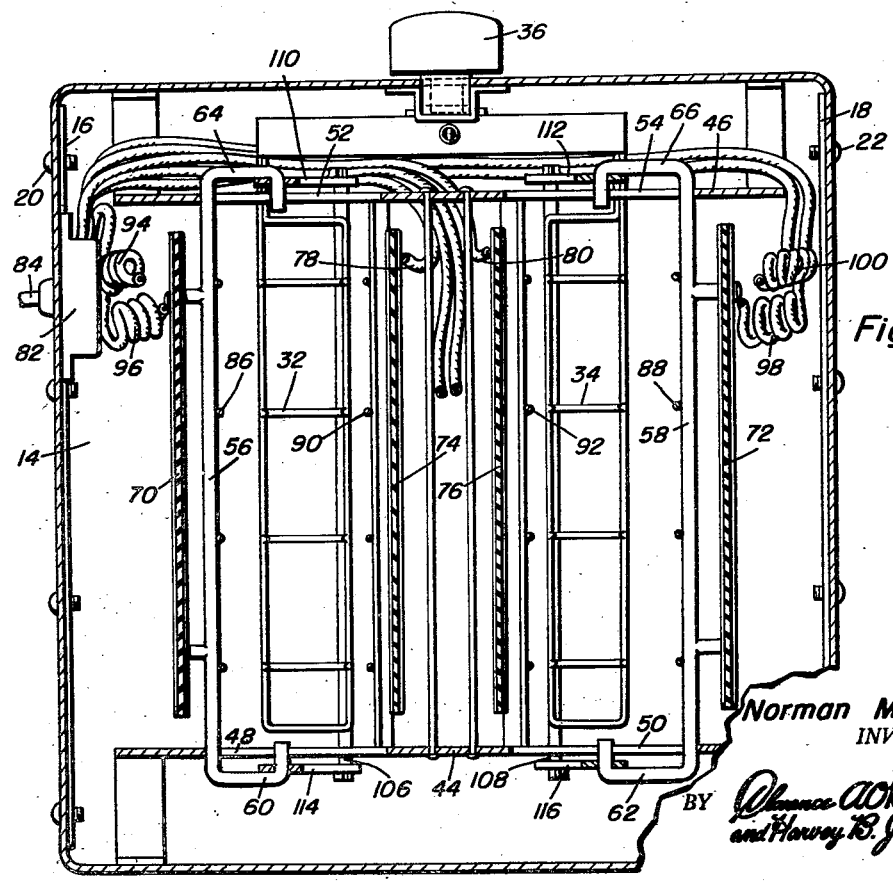
Figure 4 is a horizontal sectional view in an enlarged scale as taken along the plane of line 4—4 of Figure 2 and illustrating in particular the construction of the mounting rods and associated mechanisms.
Figure 2:
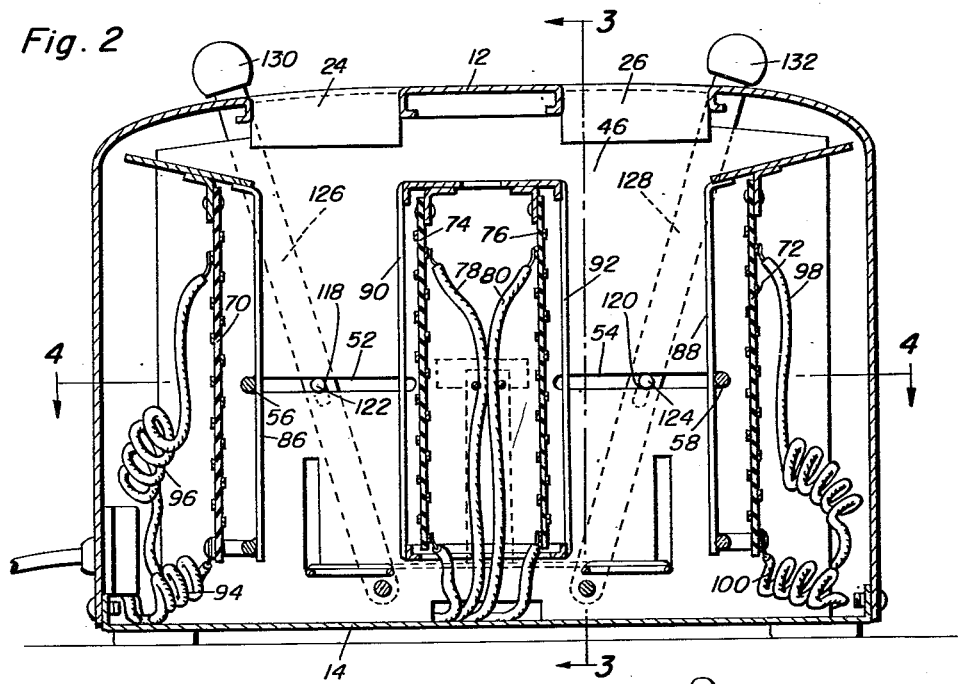
Figure 2 is an enlarged vertical sectional view as taken along the plane of line 2—2 in Figure 1.
Figure 3:
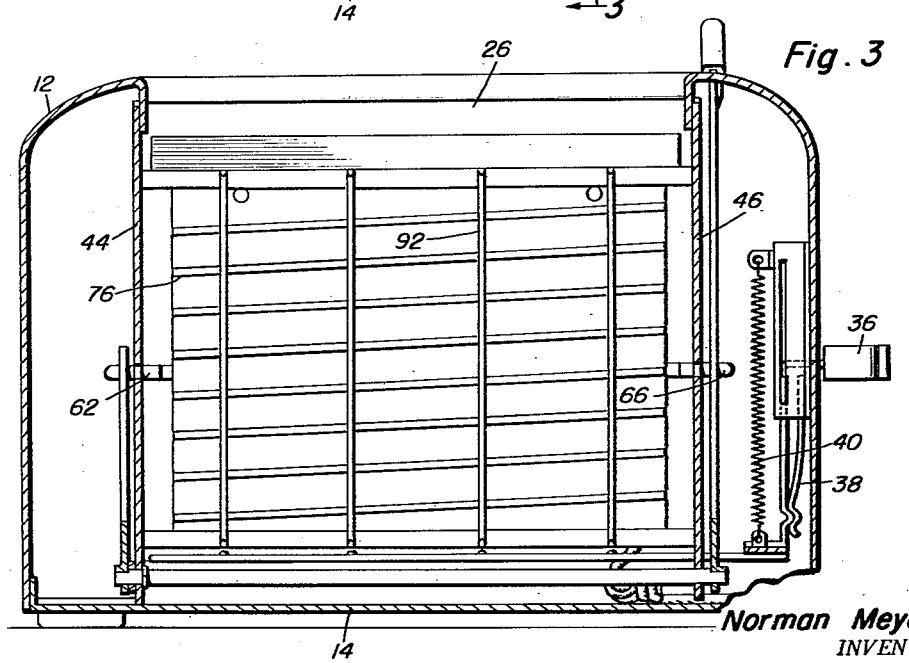
Figure 3 is an enlarged vertical sectional view as taken along the plane of line 3—3 in Figure 2 and illustrating in particular the construction of the fixed heating element assembly.

Forming a part of the housing 12 are a pair of mounting plates 44 and 46. Each of the mounting plates 44 and 46 are provided with a pair of slots, as at 48 and 50, and 52 and 54. As can be best seen in Figure 4, a pair of mounting rods 56 and 58 are provided, and these mounting rods have L-shaped end extension portions 60, 62, 64 and 66, respectively.

The mounting rod 56 as well as the L-shaped end extension portions 60 and 64 extend through the slots 48 and 52, while the mounting rod 58 as well as the L-shaped extension portions 62 and 66 extend through the slots 50 and 54, the L-shaped end extension portions being provided to assure vertical stability to the mounting rods 56 and 58 and their associated mechanisms.

Affixed to the mounting rods 56 and 58 are heating elements 70 and 72 of conventional construction which are opposed to heating elements 74 and 76 mounted in the central portion of the housing in fixed position and being connected by conductors 78 and 80 to a connection box 82 to which a conductor cord 84 leading to a suitable source of electrical current is connected. Also mounted on the mounting rods 58 are spacer grills 86 and 88 which are inwardly spaced with respect to the heating elements 70 and 72 and which are arranged in opposed relationship to grills 90 and 92 protecting the heating elements 74 and 76.

The heating elements 70 and 72 are connected by means of coiled flexible conductors, as at 94, 96 and 98, 100, to the connection box 82 for supplying these heating elements with a suitable source of electrical current. Of course, any suitable switch mechanism which may be associated with the lifter handle 36 may be provided for controlling flow of electrical current from the conductor cord 84 to the various heating elements.

A pair of shafts 106 and 108 are rotatably mounted in the mounting plates 44 and 46, and a pair of arms 110 and 112 are connected to the shafts 106 and 108. These arms are provided with slots therein, not shown, in which the L-shaped ends 64 and 66 of the mounting rods 56 and 58 ride. In addition, a pair of handles 114 and 116 are rigidly mounted on the shafts 106 and 108 and have slots 118 and 120 therein through which pins 122 and 124 extend, the pins being affixed to handles 126 and 128 having knobs 130 and 132. The handles 126 and 128 extend upwardly through the slots 28 and 30. The handles 126 and 128 have lugs 134 and 136 which cooperate with depressions or notches 140 and 142 in the housing 12, these depressions 140 and 142 opening into the slots 28 and 30. These depressions serve to lock the handles in a selected position, and it is to be recognized that suitable indicia indicating the relative position of the handles may be provided.

The operation of this invention is quite simple. When it is desired to toast a thin slice of bread, it is merely necessary to deposit this bread into one of the openings 24 and 26 and then move either the handle 126 or 128 using the knobs 130 and 132 to a suitable position whereby the spacer grills embrace the slice of bread or roll. Then, the lifter mechanism may be actuated, lowering the slice of bread and exciting the heating elements. It is to be recognized that the position of the lifter mechanism, of course, controls the heating position of the movable heating assemblies.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claim.

What is claimed as new is as follows:

An adjustable electric toaster comprising in combination a housing, said housing having an opening therein, a lift assembly disposed in said housing in alignment with said opening, thermostatically controlled spring operated means for actuating said lift assembly, a fixed vertically disposed heating element in said housing on one side of said lift assembly, a vertically disposed movable heating element assembly in said housing on the other side of said lift assembly, means for moving said movable heating element assembly towards and away from said fixed heating element assembly, said movable heating element assembly including a mounting rod, a spacer grill attached to said mounting rod, a heating coil carried by said mounting rod outwardly spaced from said spacer grill with respect to said fixed heating element assembly, said housing having a pair of spaced mounting plates, said plates having slots therein, said mounting rod extending through said slots, said mounting rod having L-shaped end extension portions also extending through said slots, said means including a handle pivotally mounted in said plates, a slot in said handle, said mounting rod extending through said slot in said handle, and means in said housing for holding said handle in a selected position.

References Cited in the file of this patent
UNITED STATES PATENTS

| | | |
|---|---|---|
| 1,173,742 | Roos | Feb. 29, 1916 |
| 1,332,879 | Beskrow | Mar. 9, 1920 |
| 1,655,192 | Murphy | Jan. 3, 1928 |
| 1,687,712 | Chandler | Oct. 16, 1928 |
| 1,734,611 | Chandler | Nov. 5, 1929 |
| 1,903,089 | Browning | Mar. 28, 1933 |
| 1,948,739 | Wolcott et al. | Feb. 27, 1934 |
| 2,764,081 | Glasser | Sept. 25, 1956 |